United States Patent
Yamanaka et al.

(10) Patent No.: US 6,762,371 B2
(45) Date of Patent: Jul. 13, 2004

(54) COMBINATION WEIGHING DEVICE AND COMBINATION WEIGHING AND PACKAGING SYSTEM HAVING A SAMPLING FUNCTION

(75) Inventors: Masayuki Yamanaka, Ritto (JP); Kazuhisa Chimura, Ritto (JP); Syuji Murata, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 163 days.

(21) Appl. No.: 10/128,555

(22) Filed: Apr. 24, 2002

(65) Prior Publication Data

US 2002/0157876 A1 Oct. 31, 2002

(30) Foreign Application Priority Data

Apr. 26, 2001 (JP) ........................................ 2001-128698

(51) Int. Cl.[7] ............................................ G01G 19/387
(52) U.S. Cl. .................................................... 177/25.18
(58) Field of Search ........................................ 177/25.18

(56) References Cited

U.S. PATENT DOCUMENTS

| | | | | |
|---|---|---|---|---|
| 4,466,500 A | * | 8/1984 | Mosher et al. ................. | 177/1 |
| 4,522,274 A | | 6/1985 | Konishi et al. | |
| 4,549,617 A | | 10/1985 | Matsumoto et al. | |
| 4,678,046 A | * | 7/1987 | Mosher ......................... | 177/1 |
| 4,742,877 A | | 5/1988 | Kawanishi | |
| 4,813,503 A | * | 3/1989 | Douglas et al. .......... | 177/25.18 |
| 4,828,054 A | * | 5/1989 | Mosher ................... | 177/25.18 |
| 4,840,240 A | * | 6/1989 | Toyoda et al. ........... | 177/25.18 |
| 5,211,253 A | | 5/1993 | Davis, Jr. | |
| 5,258,580 A | * | 11/1993 | Bergholt ................... | 177/25.18 |
| 5,753,867 A | * | 5/1998 | Konishi et al. .......... | 177/25.18 |
| 5,760,343 A | | 6/1998 | Arimoto et al. | |
| 6,373,001 B1 | * | 4/2002 | Kono et al. .............. | 177/25.18 |

* cited by examiner

Primary Examiner—Randy W. Gibson
(74) Attorney, Agent, or Firm—Shinjyu Global IP Counselors, LLP

(57) ABSTRACT

A combination weighing device includes a calculation part, a normal discharge part, a sample selection part, and a sample discharge part. The calculation part selects a plurality of types of articles according to a predetermined ratio and the weights thereof. The sample selection part selects specific types of articles from amongst the plurality of types of articles selected by the calculation part. The sample discharge part discharges the specific types of articles selected by the sample selection part.

10 Claims, 13 Drawing Sheets

COMBINATION WEIGHING DEVICE AND COMBINATION WEIGHING AND PACKAGING SYSTEM HAVING A SAMPLING FUNCTION

BACKGROUND OF THE INVENTION

1. Field of the Invention

The present invention relates to a combination weighing device and a combination weighing and packaging system. More particularly, the present invention relates to a combination weighing device and a combination weighing and packaging system that weighs each type of a plurality of types of articles, and then conducts combination weighing based upon their weights.

2. Background Information

A combination weighing device that mixes and discharges a plurality of types of articles, e.g., one that conducts "mixed" weighing, is typically used on frozen food or snack food production lines. With this type of combination weighing device, a plurality of types of articles are each divided into portions having a predetermined weight or quantity, mixed together, and then discharged therefrom as a combination article.

With these types of combination weighing devices, quality management must be performed on the articles discharged from these devices because they are mainly used on production lines that handle food. Quality management involves randomly checking the quality, the weight, and other characteristics of each respective article that makes up the combination article. In addition, it is also necessary to keep each respective article that was sampled for a predetermined period of time so that problems with quality can be traced back to their source.

However, in order to confirm the quality, weight and other characteristics of each respective article in a mixed article, they must be first sorted by hand, and this process consumes a great deal of time and labor. In addition, because the sorting is conducted by hand, there are times when article sorting will not be carried out properly, and mistakes will occur.

It is therefore an object of the present invention to make the task of managing the quality of the combination articles easier.

SUMMARY OF THE INVENTION

According to one aspect of the present invention, a combination weighing device weighs each type of a plurality of types of articles, and then carries out a combination weighing based upon the weights of the plurality of types of articles. The combination weighing device comprises a calculation means, a normal discharge means, a sample selection means, and a sample discharge means. The calculation means conducts a mixed combination weighing of the plurality of types of the plurality of articles weighed according to a predetermined ratio. A normal discharge means discharges the articles selected by the calculation means. A sample selection means selects a specific type of article from amongst the plurality of types of articles selected by the calculation means. A sample discharge means discharges the specific type of article selected by the sample selection means.

In this combination weighing device, a plurality of types of a plurality of articles are weighed, and then based upon their weights, are combined and then discharged by the normal discharge means. On the other hand, if the quality, weight, or other characteristics of each type of article are to be checked, a specific type of article to be checked is selected by the sample selection means. The specific type of article selected by the sample selection means is discharged as a random inspection sample by the sample discharge means.

Here, when each type of article handled by a combination weighing unit is to be randomly inspected, the specific type of article selected will be discharged. This eliminates the need to manually sort that type of article from the combination article in order to inspect it, and makes the work of quality management easier.

In addition, when expensive types of articles are used, and samples are discharged in the mixed state, the expensive articles are discharged at the same time.

If the sample inspection is to occur on a type of article other than the expensive type, the expensive type of article will be wasted and thus cost the manufacturer money. However, with the combination weighing device of the present invention, a sample inspection can be performed more inexpensively because it can discharge the specific type of article desired to be inspected.

According to another aspect of the present invention, the sample selection means selects a plurality of specific types of articles from amongst the plurality of types of articles.

Here, the sample selection means selects a plurality of types of articles from amongst the plurality of types of articles handled by the combination weighing device. Because of this, a plurality of types of articles to be mixed together by the combination weighing device can be separately discharged as samples. In addition, all of the types of articles handled by the combination weighing device can be selected; and this makes it possible to separately discharge all of the types of articles to be discharged from the combination weight device as samples. This allows flexibility in the type of inspections to be carried out.

According to another aspect of the present invention, the sample discharge means individually and serially discharges each type of article.

Here, specific types of articles can be separately discharged. This eliminates the need to manually sort the types of articles to be inspected, and thus makes the work of quality management easier.

In addition, individual units from the types of articles one wants to inspect can be discharged. For example, articles that are very sticky easily create discrepancies in weight because they often stick to the combination weighing device and are not discharged therefrom. Furthermore, manually sorting them from other types of articles that they are combined with is very difficult. By separately discharging these sticky articles, their inspection becomes even easier.

According to another aspect of the present invention, the combination weighing device further comprises a switching means. During normal operations, the switching means switches between article discharge by means of the normal discharge means and article discharge by means of the sample discharge means.

In this combination weighing device, when switching is to occur by means of the switching means during normal operations, normal operations will be suspended, and the sample discharge means will discharge a sample.

Here, a sample can be discharged during normal operations. This allows samples to be obtained at arbitrary times during normal operations. Thus, because it is possible to inspect samples taken during normal operations, inspections that conform to reality are made possible.

According to another aspect of the present invention, the switching means discharges the articles by means of the normal discharge means after discharging the articles by means of the sample discharge means.

Here, the combination weighing device returns to normal operations after a sample has been discharged. Thus, because articles can be discharged as samples without stopping the operation of the combination weighing device, the samples can be inspected without stopping the production line.

According to another aspect of the present invention, the combination weighing device further comprises a reservation means that reserves a selection by means of the sample selection means. In addition, the sample selection means makes a selection based upon the reservation in the reservation means.

Here, because sample discharge can be programmed to occur in advance, the samples can be discharged automatically and reliably.

According to another aspect of the present invention, the reservation means can schedule a selection to be made at a particular time, at fixed time periods, each time a predetermined number of articles have been discharged by the normal discharge means, or as a predetermined percentage of each production run of articles.

Here, samples can be discharged based upon fixed criteria. In addition, it becomes possible to periodically discharge samples according to the criteria stored in the reservation means. In other words, it becomes possible to conduct inspections according to the settings entered in the reservation means, and also allows flexibility in inspections. Thus, this makes it possible to reliably conduct periodic inspections of discharged samples to check the quality thereof. In addition, it also becomes possible to ensure that quality problems with the articles can be traced.

According to another aspect of the present invention, the combination weighing device further comprises a sample sorting device that sorts the articles that are discharged by the sample discharge means.

The sample sorting means sorts articles discharged when the sample discharge means is employed to a discharge area that is different from that used during normal operations.

Here, articles discharged during normal operations can be clearly distinguished from samples because the sample sorting means is provided herein. Thus, it becomes unnecessary to distinguish between and sort normally discharged articles and samples.

According to another aspect of the present invention, a combination weighing and packaging system comprises a combination weighing device and a packaging device. The packaging device packages and discharges articles discharged from the combination weighing unit.

Like the articles discharged during normal operations, this combination weighing and packaging system also packages samples in the packaging device that have been discharged from the combination weighing device.

Here, because the articles discharged from the combination weighing device are packaged, the samples can be both handled and sorted with ease. In particular, even when sorting occurs downstream of the combination weighing device and the packaging device, the sorting is made easier because the samples are packaged. In addition, packaging the samples prevents them from being scattered and spilled around the vicinity of the devices. Moreover, storing the samples is made easier, and tracing quality problems with the articles is made even easier and more reliable.

According to another aspect of the present invention, the combination weighing and packaging system further comprises a weight checker that measures the weights of the articles packaged by the packaging device.

In this system, it can be confirmed whether or not the weights of each packaged article is within a predetermined weight range because the weights of the packaged articles can be confirmed by the weight checker. For example, because the weight of an article that will be used as a sample will be lighter than a combination article discharged during normal operations, it becomes possible to check the weight of each article and sort them according to whether they are normal articles or samples. Note also that because the weight checker is permanently disposed on the production line as a weight inspection device that checks all of the articles, a new device that distinguishes between sample articles and articles discharged during normal operations is not required.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

1. First Embodiment a. Overall Configuration

Figure 1:
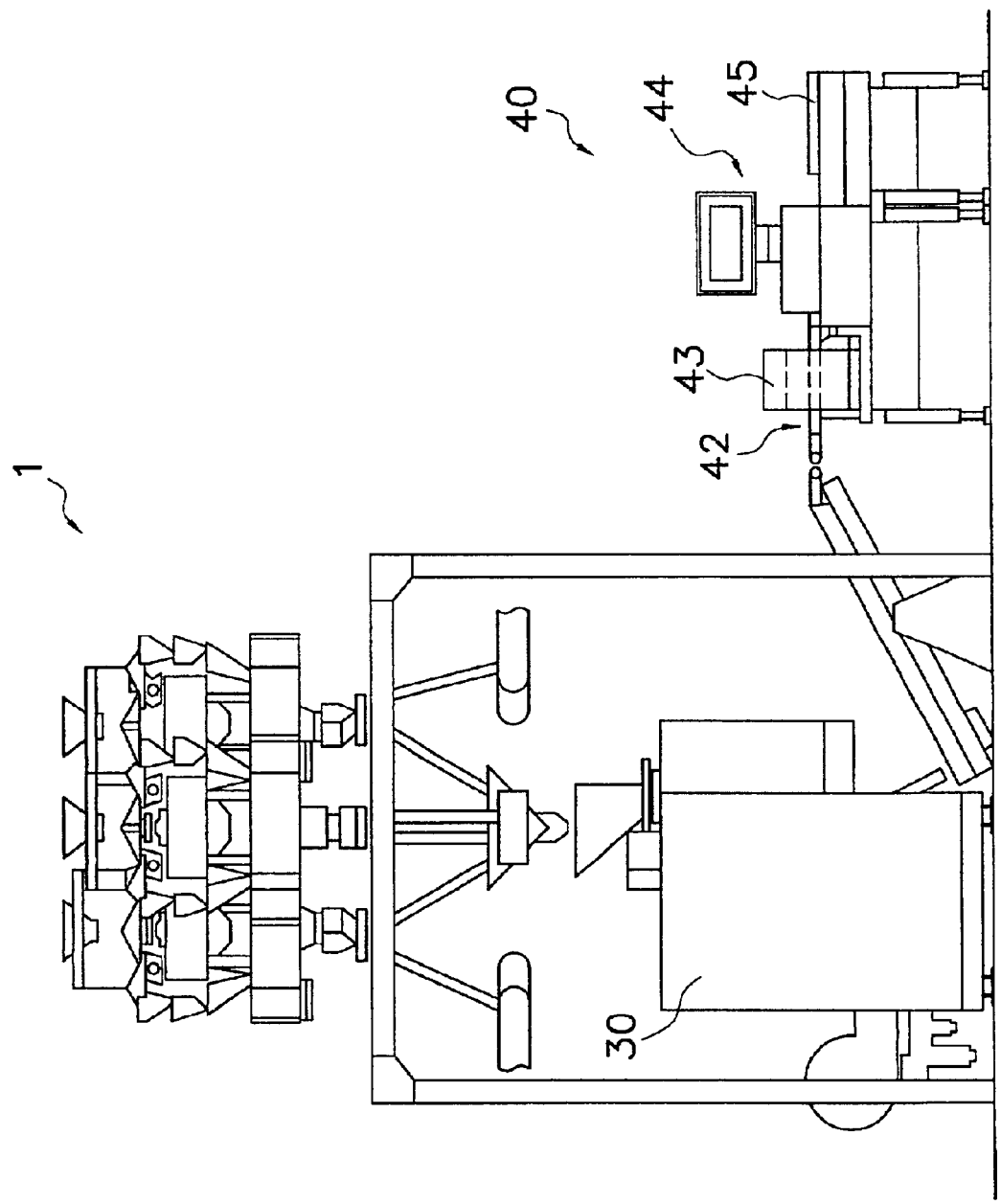
FIG. 1 is a lateral view of a combination weighing and packaging system according to a first embodiment of the present invention.

A combination weighing and packaging system according to a first embodiment of the present invention is shown in FIG. 1. The combination weighing and packaging system comprises a combination weighing device 1, a packaging device 30, and a weight checker 40.

Figure 2:
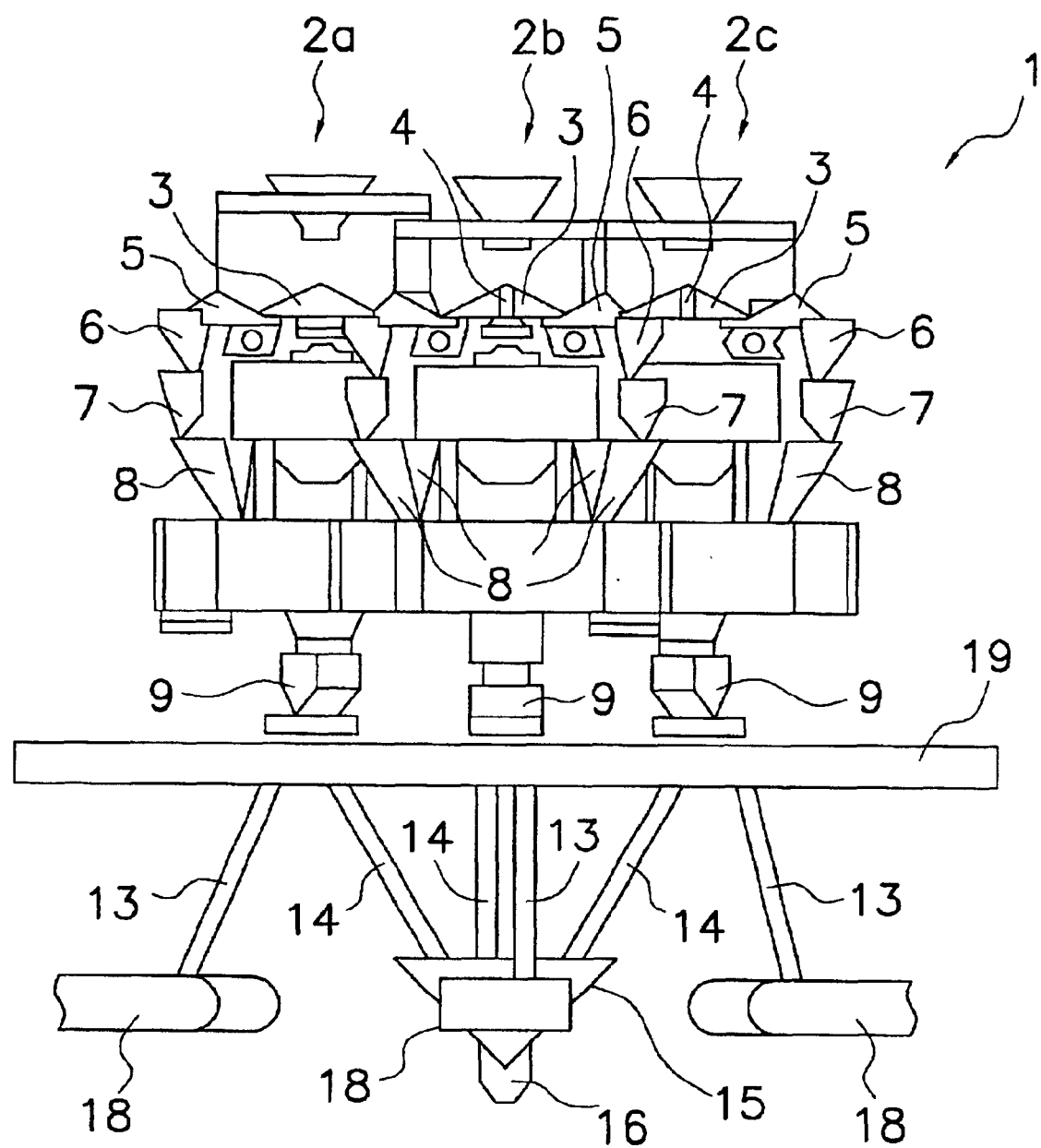
FIG. 2 is a lateral view of a combination weighing device according to the first embodiment of the present invention.
Figure 3:
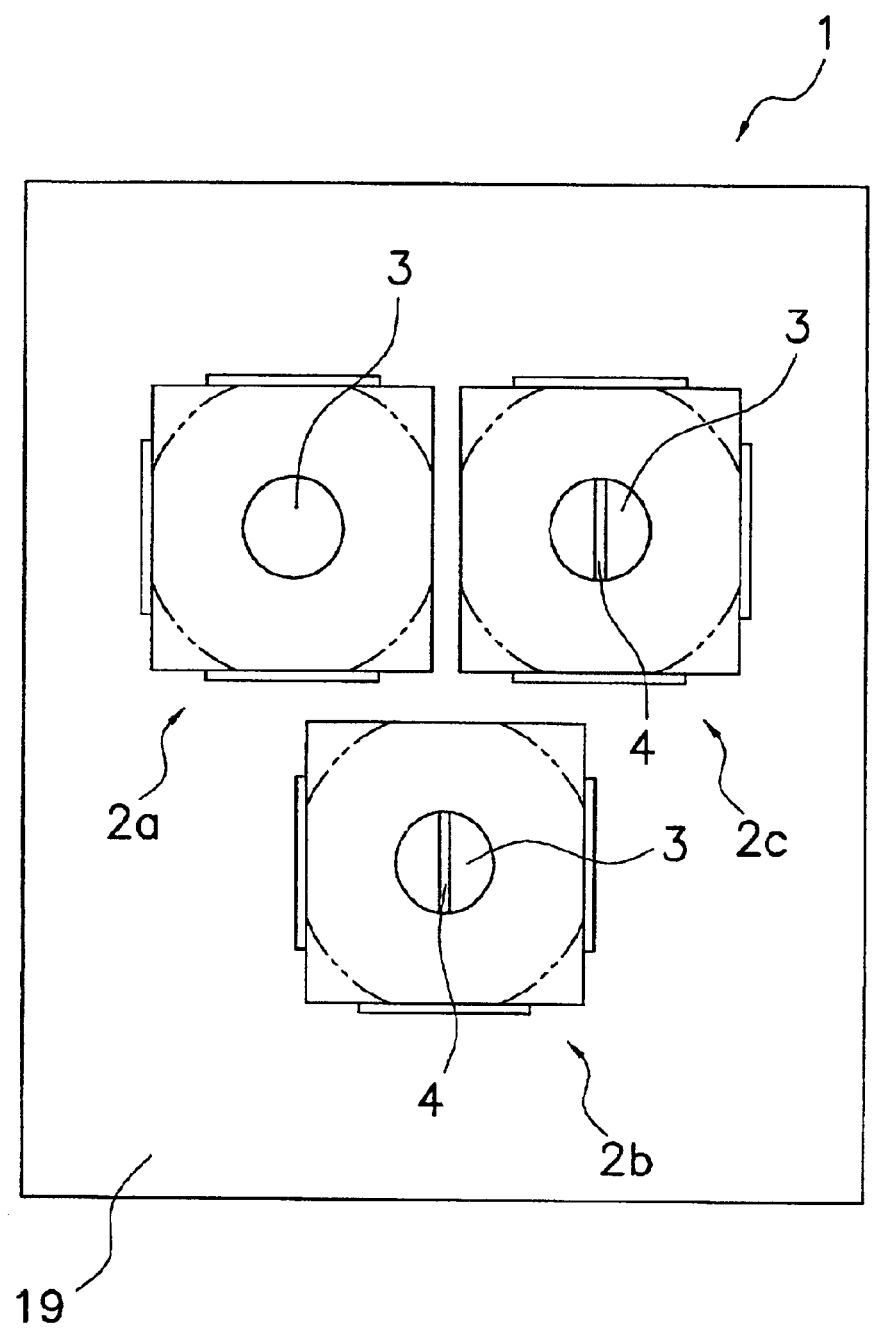
FIG. 3 is a plan view of the combination weighing device shown in FIG. 2.

The combination weighing device 1 shown in FIGS. 2 and 3 weighs and combines articles supplied thereto and discharges combination articles of predetermined weights. FIG. 2 is a lateral view of the combination weighing device 1, and FIG. 3 is a plan view of the combination weighing device 1. The packaging device 30 packages and discharges the combination articles that have been discharged from the combination weighing device 1. The weight checker 40 measures the weights of the packaged combination articles discharged from the packaging device 30.

In this system, articles are first supplied to the combination weighing device 1 and weighed. Then the articles are combined into combinations having a predetermined weight and discharged therefrom. A plurality of articles weighed and discharged by the combination weighing device 1 are sent to the packaging system 30 and packaged. The packaged articles are sent to the weight checker 40 by a belt conveyer. The weights of the packaged articles are confirmed in the weight checker 40. The packaged articles are then sorted by a sorter 45 according to predetermined parameters based upon the results from the weight checker 40. For example, assuming that the preset weight is 100 grams and the upper and lower limits are approximately 5 grams, then articles that weigh 95 grams or lower, or 105 grams or higher, are sorted from the articles that have the correct weight.

b. Combination Weighing Device

As shown in FIG. 2, the combination weighing device 1 includes three combination weighing units 2a, 2b, and 2c disposed adjacent to the upper portion of a base 19.

The combination weighing units 2a, 2b and 2c are all identical to each other, and each includes a distribution feeder 3 disposed on the bottom of an intake member on the uppermost portion of the unit, and a plurality of discharge feeders 5 that are disposed around the outer circumference of the distribution feeder 3. A pool hopper 6, a weighing hopper 7 and a collection chute 8 are provided in series below each of the plurality of discharge feeders 5. In addition, a collection hopper 9 is provided below each of the plurality of collection chutes 8, and is supplied with articles therefrom.

The distribution feeder 3 has a conical shape, and distributes articles supplied thereto around the circumference thereof by vibrating. As shown in FIG. 3, a partition 4 is provided inside each distribution feeder 3 so that a plurality of types of articles can be distinguished and processed. In addition, the discharge feeders 5 also vibrate, and this conveys articles from each distribution feeder 3 through the discharge feeders 5 and into the pool hoppers 6.

The pool hoppers 6 store the articles supplied thereto by the discharge feeders 5, and the weighing hoppers 7 measure the weights of the articles stored therein. In addition, the collection hoppers 9 sort and discharge articles to out-system chutes 13 and in-system chutes 14.

Each of the plurality of out-system discharge chutes 13 and in-system discharge chutes 14 are provided below the base 19. In addition, one combination chute 15 is provided below the plurality of in-system discharge chutes 15, and a timing hopper 16 is provided below the combination chute 15. The timing hopper 16 is a storage member that serves to combine and discharge the articles discharged from the combination weighing units 2a, 2b and 2c. The articles discharged from the timing hopper 16 are supplied to the packaging device 30 disposed below it. In addition, a conveyer 18 is provided opposite each of the plurality of out-system discharge chutes 13.

Figure 4:
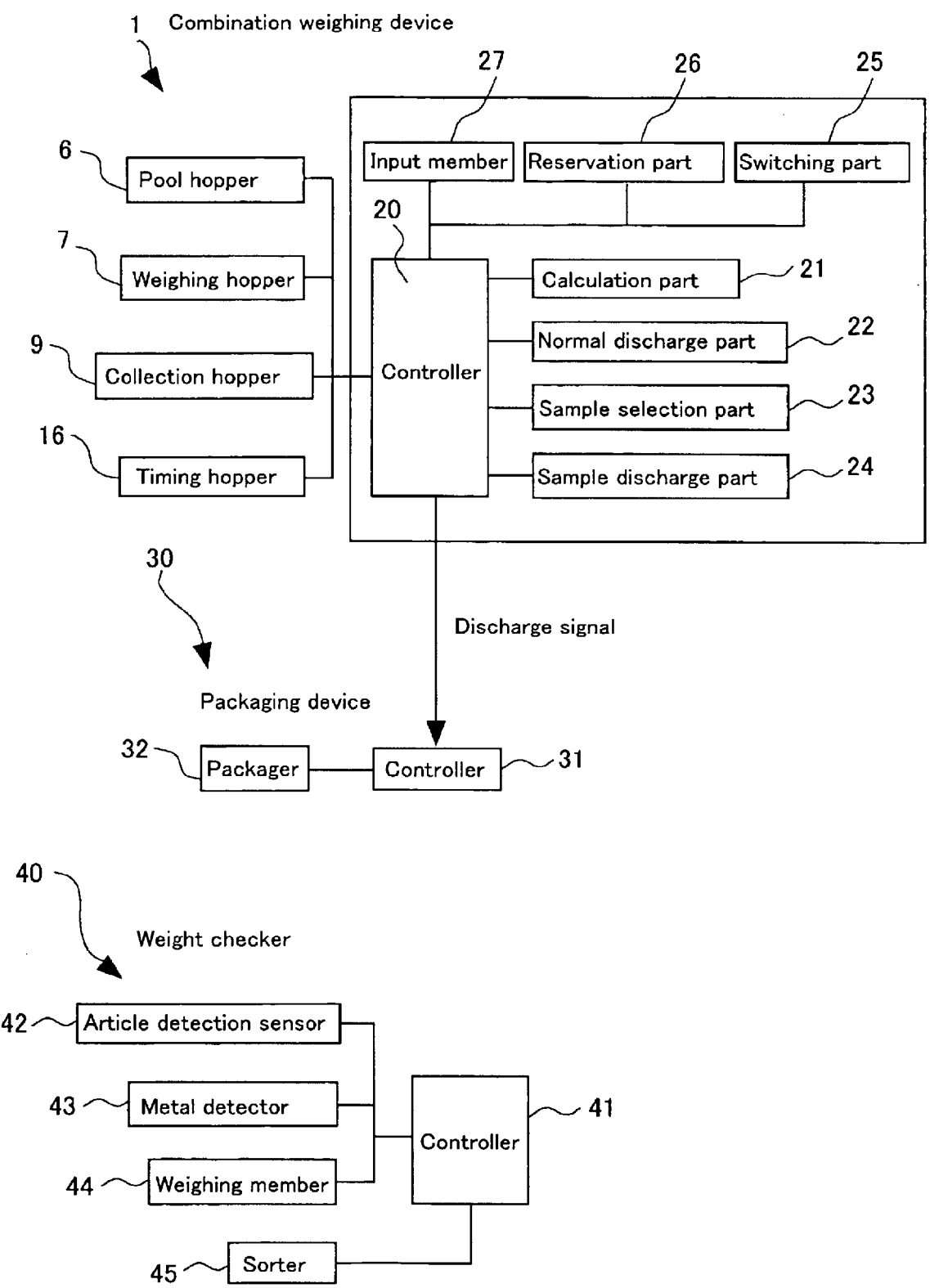
FIG. 4 shows the control blocks for the combination weighing and packaging system shown in FIG. 1.

FIG. 4 shows the control blocks of the present system.

The combination weighing device 1 includes a microprocessor comprised of a controller 20, a calculating part 21, a normal discharge part 22, a sample indication part 23, a sample discharge part 24, a switching part 25, a reservation part 26, and an input member 27.

The calculation part 21 conducts a combination calculation based upon the weight results from the weighing hoppers 7, and selects the weighing hoppers 7 that have weight values which match predetermined criteria. The normal discharge part 22 combines the articles in the weighing hoppers 7 selected by the calculation part 21, and discharges those articles as normal combination articles. The sample selection 23 selects one or more specific types of articles from amongst the plurality of articles to be combined, i.e., a sample to be inspected for quality control purposes. In addition, the sample discharge part 24 individually and serially discharges each specific type of article selected by the sample selection part 23.

In addition, the switching part 25 serves to switch between normal discharge and sample discharge. The reservation part 26 serves to schedule a sample selection by the sample selection part 23. The reservation can include instructions to discharge samples at a fixed time, discharge samples every fixed period of time, discharge samples at every fixed amount of normal discharge, or discharge a predetermined percentage of the total volume of normal discharge as samples. The parameters for the reservation means can be input via the input member 27.

Next, the operation of the combination weighing device 1 will be briefly described.

A plurality of types of articles that are to be combined are supplied to the distribution feeders 3 by means of supply conveyers (not shown in the figures). Then, by vibrating the distribution feeders 3, the articles on the surfaces thereof are distributed around the circumferences thereof, and are then dispensed down to the discharge feeders 5. Then, the articles are further conveyed to the discharge feeders 5 by vibrating the same, and are supplied to the pool hoppers 6. The articles are then temporarily stored in the pool hoppers 6.

The weights of articles stored in each weighing hopper 7 are then measured. When a weighing hopper 7 is determined to be empty, articles are supplied thereto from the pool hopper 6 located directly above it.

Then, certain weighing hoppers 7 are selected from amongst the plurality of weighing hoppers 7 such that the combined weight of the articles therein is within a predefined weight range and the percentage of the types of articles in the combination meet predefined criteria. The articles in the selected weighing hoppers 7 are then discharged to collection chutes 8 and collected in collection hoppers 9. Next, the articles in each collection hopper 9 are divided into two portions thereby, and one or both portions therein are then discharged to the combination chute 15 via the in-system discharge chute 14 and stored in the timing hopper 16. The articles collected in the timing hopper 16 are then supplied to the packaging device 30 below according to a predetermined timing.

In addition to the normal combination and discharge of articles as described above, sample discharge for the purpose of random sampling is also made possible by the present embodiment. Details on the sample discharge will be provided below.

C. Packaging Device

The packaging device 30 is disposed below the combination weighing device 1, and as shown in FIG. 4, includes a controller 31 and a packager 32.

The controller 31 controls the packager 32 by receiving discharge signals from the combination weighing device 1, and the packager 32 packages articles discharged from the combination weighing device 1. Note that the articles packaged by the packaging device 30 are sent to the weight checker 40 by means of a conveyor. Then, when the articles are packed by the packager 32, the controller 31 sends a sort signal to the weight checker 40.

d. Weight Checker

As shown in FIG. 4, the weight checker 40 includes a controller 41, an article detection sensor 42, a metal detector 43, a weighing member 44, and a sorter 45. The controller 41 controls the weight checker 40. The article detection sensor 42 is provided upstream of the metal detector 43, and detects the movement of the packages by the conveyor. The metal detector 43 confirms that no metal has been mixed in with the packaged articles being transported by the conveyor. The weighing member 44 confirms the weights of the packaged articles. Then, the sorter 45 sorts out the packaged articles which are under or over a predetermined weight range or which have metal contained therein. The articles sorted thereby are then conveyed downstream of the device.

e. Control

The control process of each component in the device will be described with reference to the flow charts shown in FIGS. 5 to 8.

(i) Combination Weighting Device

Figure 5:
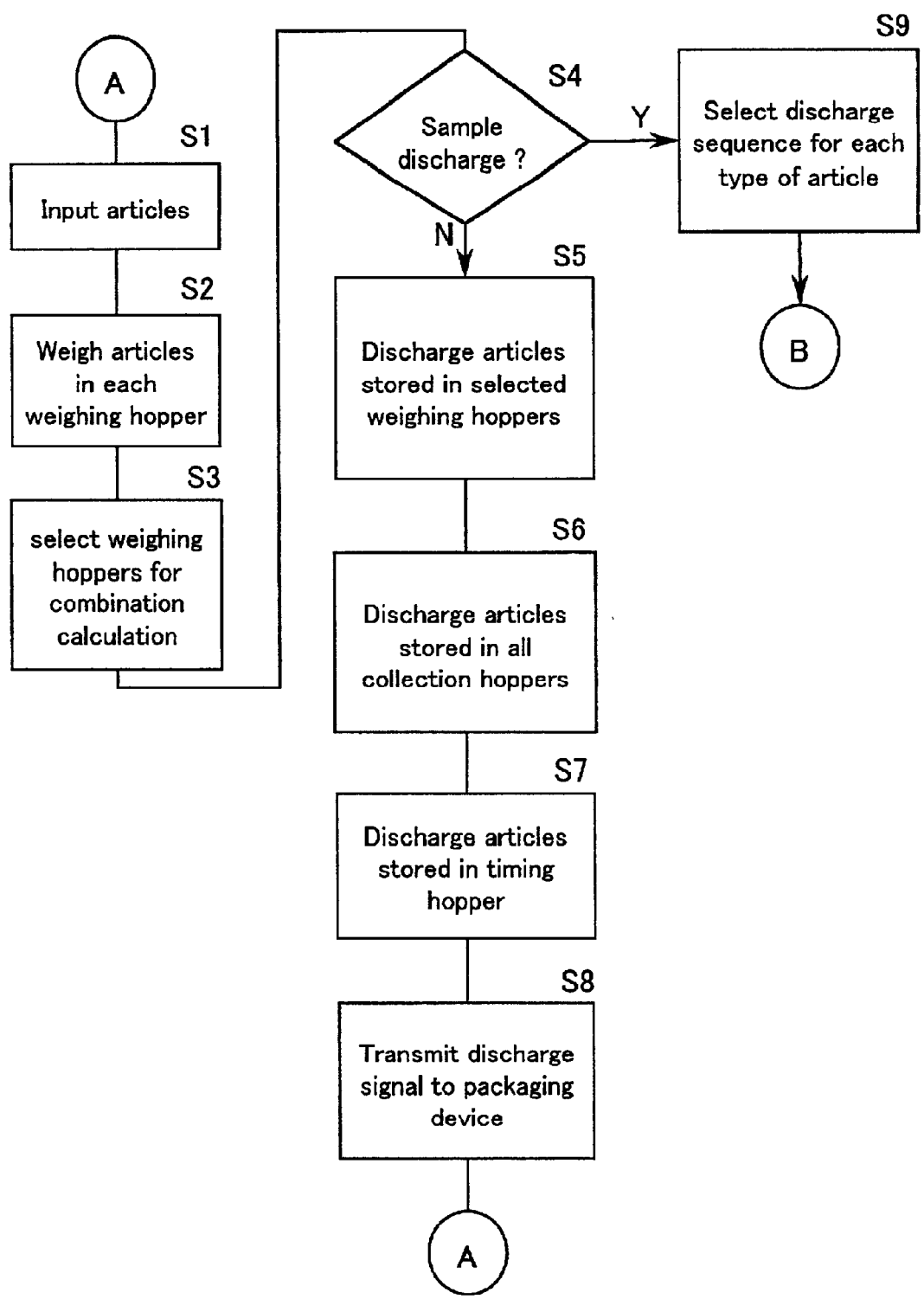
FIG. 5 is a flow chart for the combination weighing device shown in FIG. 2.
Figure 6:
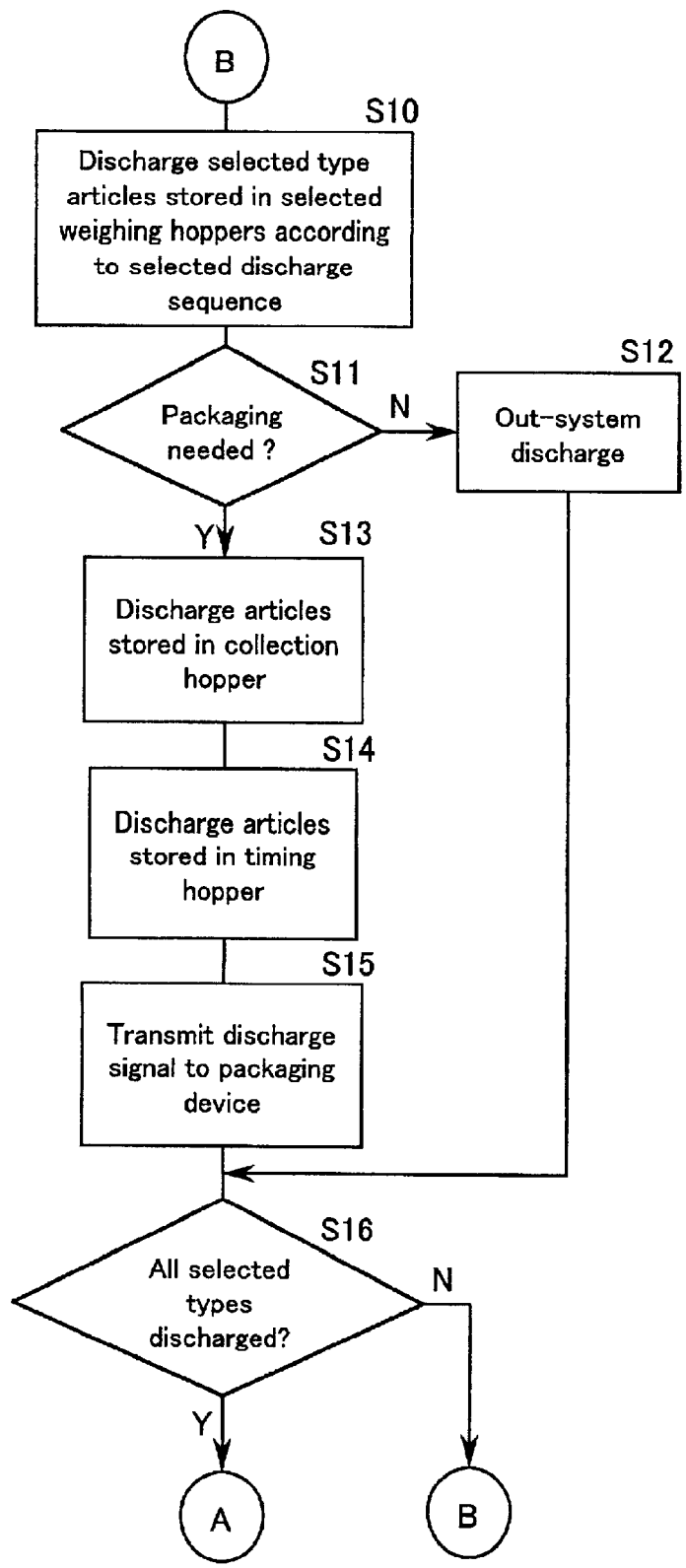
FIG. 6 is a flow chart for the combination weighing device shown in FIG. 2.

The flow charts in FIGS. 5 and 6 show the control process for the combination weighing device 1. The methods for normal article discharge and sample article discharge will be described separately.

Note that the sample discharge commands, the sample discharge reservation settings, and other information, are input by means of the input member 27. The sample discharge reservation settings can include instructions to discharge samples at a fixed time, discharge samples every fixed period of time, discharge samples at every fixed amount of normal discharge, or discharge a predetermined percentage of the total volume of normal discharge as samples.

First, articles are supplied from the pool hoppers 6 to the empty weighing hoppers 7 at Step S1. In other words, as described above, articles are supplied via the distribution feeders 3 and the discharge feeders 5 to the pool hoppers 6, and the articles stored therein are discharged therefrom to empty weighing hoppers 7.

At Step S2, the articles supplied to the weighing hopper 7 are weighed, and the results thereof are sent to the calculation part 21. At Step S3, based upon the weights of the articles stored in the weighing hoppers 7, a combination of weighing hoppers 7 are selected by the calculation part 21 such that the total weight of the articles therein is within a discharge weight range that has been determined for each type of article.

At Step S4, it is determined whether or not a sample discharge command has been input from the input member 27 or the reservation part 26. If a sample discharge command has been input, the process moves to Step S9. If a sample discharge command has not been input, the process moves to Step S5 and the normal discharge process begins.

(ii) Normal Discharge

At Step S5, the articles stored in the plurality of weighing hoppers 7 selected in Step S3 are discharged to the collection hoppers 9 via the collection chutes 8. After the articles discharged from the plurality of weighing hoppers 7 enter the collection hoppers 9, the process moves to Step S6.

At Step S6, the articles stored in all of the collection hoppers 9 are discharged to the timing hopper 16. When all of the articles are discharged from the collection hoppers 9, the process moves to Step S7. At Step S7, the articles stored in the timing hopper 16 are discharged to the packaging device 30, and at Step S8 a discharge signal is sent to the packaging device 30. After all of the articles have been transferred to the packaging device 30, the process returns to Step S1.

(iii) Sample Discharge

When sample discharge is to be performed, the discharge sequence of each type of article is to be selected at Step S9. Note that the discharge sequence selected is not limited to all types of articles being handled by the combination weighing device 1, but it is also possible to make a selection in which only certain types of articles are discharged therefrom. In addition, it is also possible to make a selection in which (a) samples are discharged according to their type, (b) some of the types of articles are first combined and then discharged, or (c) some other combination thereof.

For example, when five types of articles (A, B, C, D, and E) are being handled by the combination weighing device 1, the device can be set such that a sample of each type of article is discharged, or can be set such that articles A and D are first combined, a sample of this combination is discharged, and then a sample of article B only is discharged.

After the selection in Step S9 is completed, the process moves to Step S10 shown in FIG. 6.

At Step S10, the articles stored in the weighing hoppers 7 that were selected at Step S9 are discharged to the collection hoppers 9, via the collection chutes 8, according to the discharge sequence selected in Step S9. After discharge is completed, the process moves to Step S11.

At Step S11, it is determined whether or not the articles stored in the collection hoppers are to be packaged.

If the articles stored in the collection hoppers 9 are not to be packaged but to be discharged as is, the process moves from Step S11 to Step S12, and the articles are discharged away from the combination weighing device 1 by the out-system discharge conveyors 18 via the out-system chutes 13. The process then moves from Step S12 to Step S16.

If the articles stored in the collection hoppers 9 are to be packaged, the process moves from Step S11 to Step S13, and the articles stored in the collection hoppers 9 are discharged to the timing hopper 16. At Step S14, the articles stored in the timing hopper 16 are discharged to the packaging device 30, and at Step S15, a discharge signal is transmitted to the packaging device 30. After all of the articles have been moved to the packaging device 30, the process moves to Step S16.

At Step S16, it is determined whether or not all of the types of articles selected at Step S9 have been discharged. If all the selected types of articles have been discharged, the process returns to Step S1. On the other hand, if there are article types remaining to be discharged, the process returns to Step S10.

(iv) Packaging Device

Figure 7:
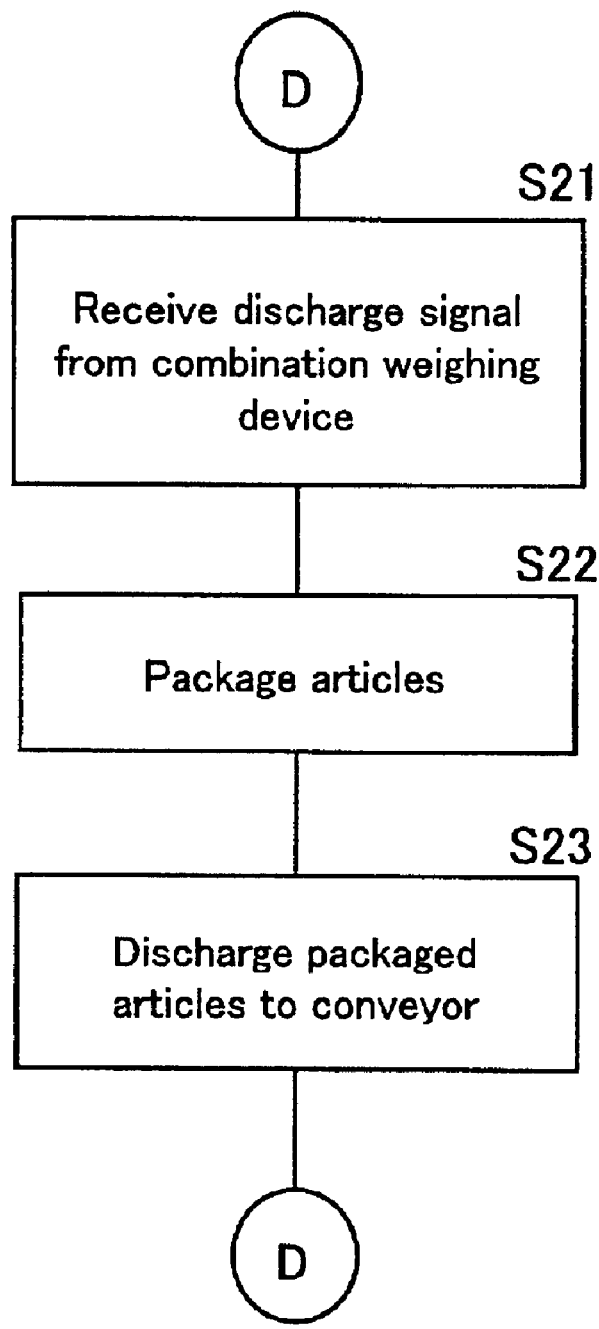
FIG. 7 is a flow chart for a packaging device according to the first embodiment of the present invention.

The packaging device 30 packages the articles discharged from the combination weighing device 1 in the packager 32 according to the flow chart shown in FIG. 7.

First, in Step S21, the discharge signal sent from the combination weighing device 1 is received.

At Step S22, the articles discharged from the combination weighing device 1 are packaged by the packager 32. At Step S23, the articles packaged in the packager 32 are discharged and conveyed by the conveyor, and the process returns to Step S21.

(v) Weight Checker

Figure 8:
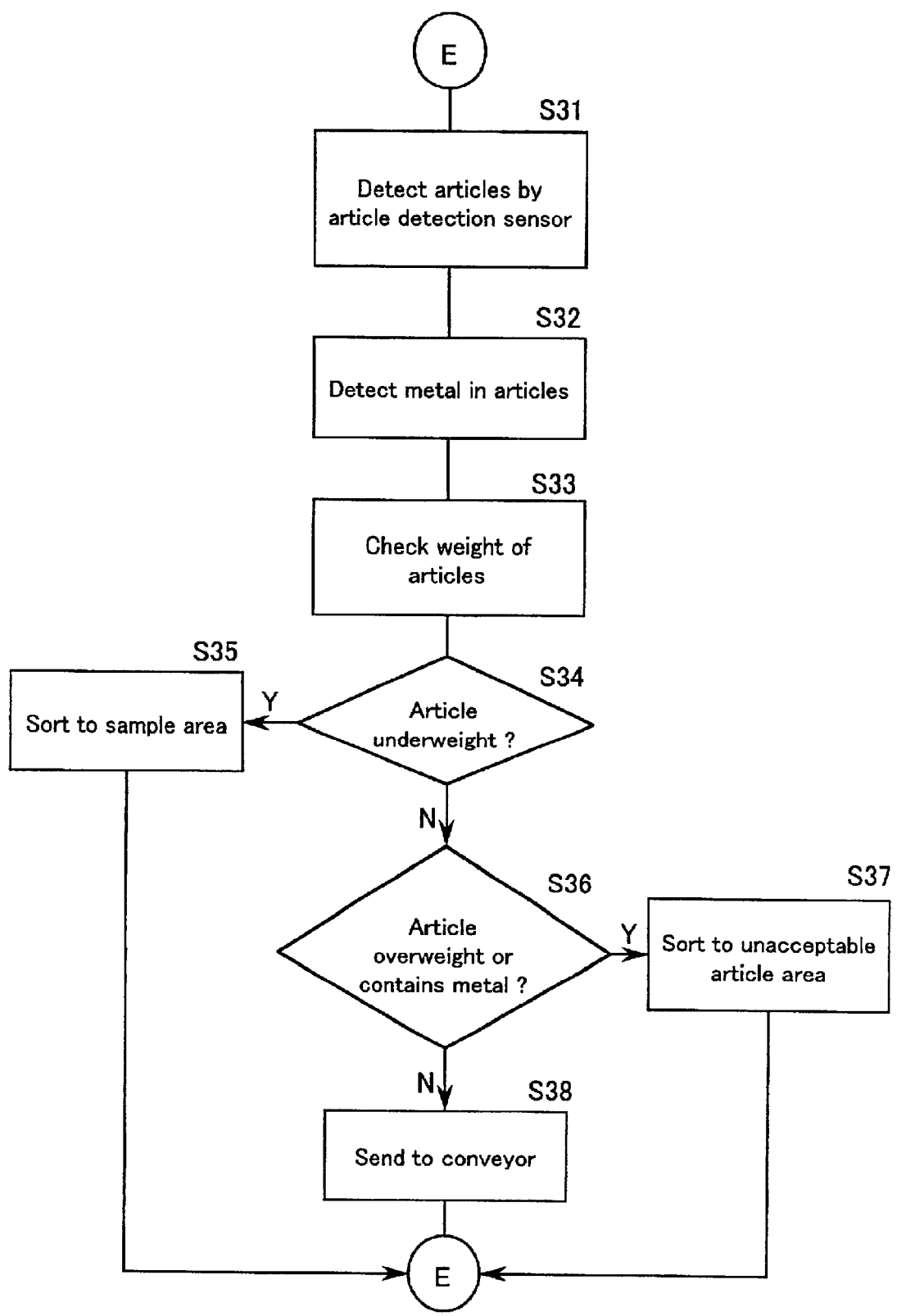
FIG. 8 is a flow chart for a weight checker according to the first embodiment of the present invention.

The weight checker 40 confirms and sorts the packaged articles conveyed via the conveyor from the packaging device 30 according to the flow chart shown in FIG. 8.

First, in Step S31, the packaged articles are detected by the article detection sensor 42 in order to confirm that the articles are being conveyed.

At Step S32, the metal detector 43 checks whether or not the packaged articles contain metal, and at Step S33, the weights of the packaged articles are measured by the weighing member 44.

Next, at Step S34, it is determined whether or not the weight of each packaged articles weighed by the weighing member 44 is lower than a predetermined weight range. If a packaged article has a weight lower than this range, the process moves to Step S35, the packaged article is reclassified as a sample or an unacceptable product, and is sorted to an unacceptable article area. The process then returns to Step S31. On the other hand, if the weight of a packaged article is not lower than the predetermined weight range, the process moves from Step S34 to Step S36.

In Step S36, it is determined whether or not the metal detector 43 has detected metal in the packaged articles, or whether or not the weight of the packaged article is higher than the predetermined weight range. If metal has been detected in the packaged article or if the packaged article is overweight, the process moves to Step S37, and the packaged article is sorted to the unacceptable article area. The process then returns to Step S31. On the other hand, if metal was not detected in the packaged article and if the weight thereof is within the predetermined weight range, then the process moves from Step S36 to Step S38, and the packaged article is sent to a conveyor and moved downstream. The process then returns from Step S38 to Step S31.

For example, the sorter 45 allows the underweight articles to be directed to the left with respect to the direction of conveyance, and the articles containing metal and the overweight articles to be directed to the right with respect to the direction of conveyance, and thus allows only the normal articles to be conveyed downstream.

In the present embodiment, it is possible to discharge samples of a plurality of types of articles handled by the combination weighing device 1 after they have each been weighed. In particular, the articles can be discharged according to their type, and can also be packaged. This allows the samples to be easily managed. In addition, the work of examining each article is made easier because the articles are separate and not combined together.

In addition, a sample discharge can be scheduled in the present invention. The discharge reservation setting can include instructions to discharge samples at a fixed time, discharge samples every fixed period of time, discharge samples at every fixed amount of normal discharge, or discharge a predetermined percentage of the total volume of normal discharge as samples.

In addition, if the samples are to be discharged without being packaged, they will be discharged from the three out-system discharge chutes 13 to the out-system conveyors 18. This makes it possible to discharge each type of article by different out-system conveyors 18, and thus allows each type of article to be clearly separated and to be discharged without being packaged. Thus, the sample articles can be inspected easier than they could be if they were packaged, because the packaging does not have to be opened.

Note also that after the normal discharge is switched to a sample discharge by the switching part 25 and the samples are discharged, the discharge state will again return to normal operations.

The weight checker 40 can sort the packaged articles sent thereto into three different categories: sample articles or underweight articles discharged during normal discharge, overweight articles discharged during normal discharge and articles containing metal objects, and normal packaged articles discharged during normal discharge. Thus, only normal articles are conveyed downstream of the device by the conveyor.

f. Modifications to the First Embodiment

In the present embodiment, articles in the weighing member 44 that weigh less than the predetermined weight range are considered to be samples and directed to a sample article area. However, by transmitting a sample signal to the weight checker 40 when the controller 20 of the combination weighing device 1 discharges a sample, and the weight checker 40 receiving the sample signal, it is possible to have a function in which a packaged article is considered to be a sample, and only samples are sorted. In this type of situation, underweight articles discharged during sample and normal discharge can be clearly distinguished. In other words, because sample goods can be specially sorted, samples can be easily obtained.

Moreover, if a sorting device having a sorter 45 that receives sample signals is provided, it becomes possible to sort sample and normal articles by receiving a sample signal. Thus, it becomes possible to conduct sorting by providing a dedicated sorting device when only samples need be obtained.

In the present embodiment, the sorter 45 can distinguish between 3 categories of packaged articles: sample articles, unacceptable articles, and normal articles. In other words, the sorter 45 performs three different sorts.

However, the number of sorts is not limited to three, and it is possible to use a sorting device or a sorter 45 which can perform many different sorts. For example, by providing two sorters 45 in series along the direction in which articles are conveyed, the number of sorts can be increased to 5. Thus, samples, underweight articles, overweight articles, articles containing metal, and normal articles can be sorted, samples will be even easier to obtain, and it will be easier to recognize and sort out unacceptable articles.

In the present embodiment, the three combination weighing units 2a, 2b, and 2c shown in FIG. 4 are controlled by one controller 20.

However, a control device can be provided for each combination weighing unit 2a, 2b, and 2c, and each control unit can be in contact with each other by means of a communication means.

In this situation, samples can be discharged from each combination weighing unit 2a, 2b, and 2c in an order of priority such that combination weighing unit 2a is first, combination weighing unit 2b is second, and combination weighing unit 2c is third. The sample discharge occurs as shown below. First, the combination weighing unit 2a discharges a sample. When it is completed, it transmits a discharge complete signal to the control device for the combination weighing unit 2b, and this control unit initiates a sample discharge in the combination weighing unit 2b. Then, when the combination weighing unit 2b completes its sample discharge, its control unit transmits a discharge completed signal to the control unit for the combination weighing unit 2c. The control device for the combination weighing unit 2c that received the discharge completed signal will then initiate and complete a sample discharge for the combination weighing unit 2c. In this way, the samples discharged from the combination weighing units 2a, 2b and 2c can be prevented from being mixed together.

2. Second Embodiment

Figure 9:
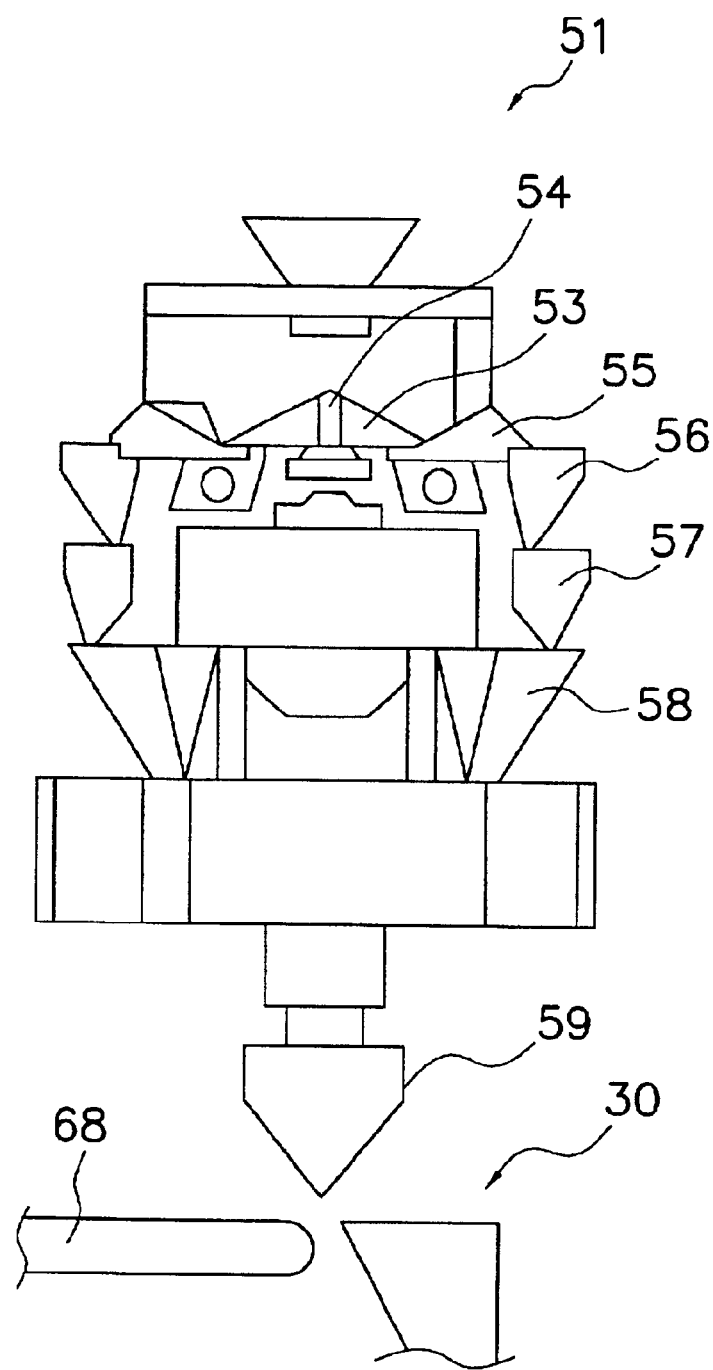
FIG. 9 is a lateral view of a combination weighing device according to a second embodiment of the present invention.
Figure 10:
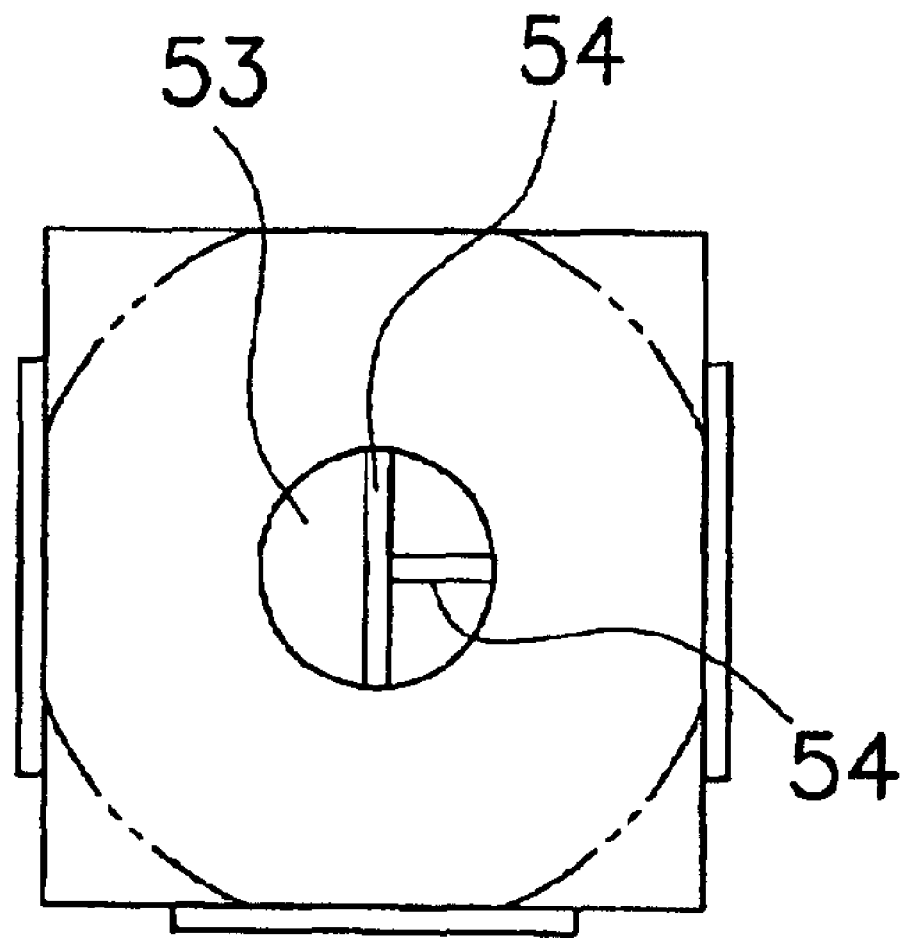
FIG. 10 is a plan view of the combination weighing device shown in FIG. 9.

A lateral view and a plan view of a combination weighing device 51 of a combination weighing and packaging system according to a second embodiment of the present invention are respectively shown in FIGS. 9 and 10. A packaging device 30 that is identical to that described in the first embodiment is provided directly below the combination weighing device 51, and is connected with a weight checker 40 by means of a conveyor.

The combination weighing device 51 discharges a combination of articles having a predetermined weight by combination weighing articles supplied thereto. The packaging device 30 packages the articles discharged from the combination weighing device 51, and the articles packaged by this packaging device 30 are sent to the weight checker 40 by means of a belt conveyor. The weight checker 40 confirms the weights of the articles and sorts them. The construction and operation of the packaging device 30 and the weight checker 40 are identical to those of the first embodiment, and are thus will not be described in any further detail.

a. Combination Weighing Device

As shown in FIG. 9, the combination weighing device 51 includes a distribution feeder 53 that is disposed on the bottom of an intake member on the uppermost portion of the device, and a plurality of discharge feeders 55 that are disposed below the outer circumference of the distribution feeder 53. Then, a pool hopper 56, a weighing hopper 57, and a collection chute 58 are provided, in that order, below each of the plurality of discharge feeders 55. Then, the articles discharged from the collection hoppers 57 are guided into a collection hopper 59 via the collection chutes 58. This collection hopper 59 sorts and discharges articles to the packaging device 30 or an out-system discharge conveyor 68.

As in the first embodiment, the distribution feeder 53 is conical in shape, and articles supplied thereto via a supply conveyor (not shown in the figures) are distributed around the circumference of the distribution feeder 53 by vibrating the same. As shown in FIG. 10, a partition 54 is provided inside the distribution feeder 53, which makes it possible to distinguish between three different types of articles. In addition, the discharge feeders 55, the pool hoppers 56 and the weight hoppers 57 are identical to those found in the first embodiment.

Figure 11:
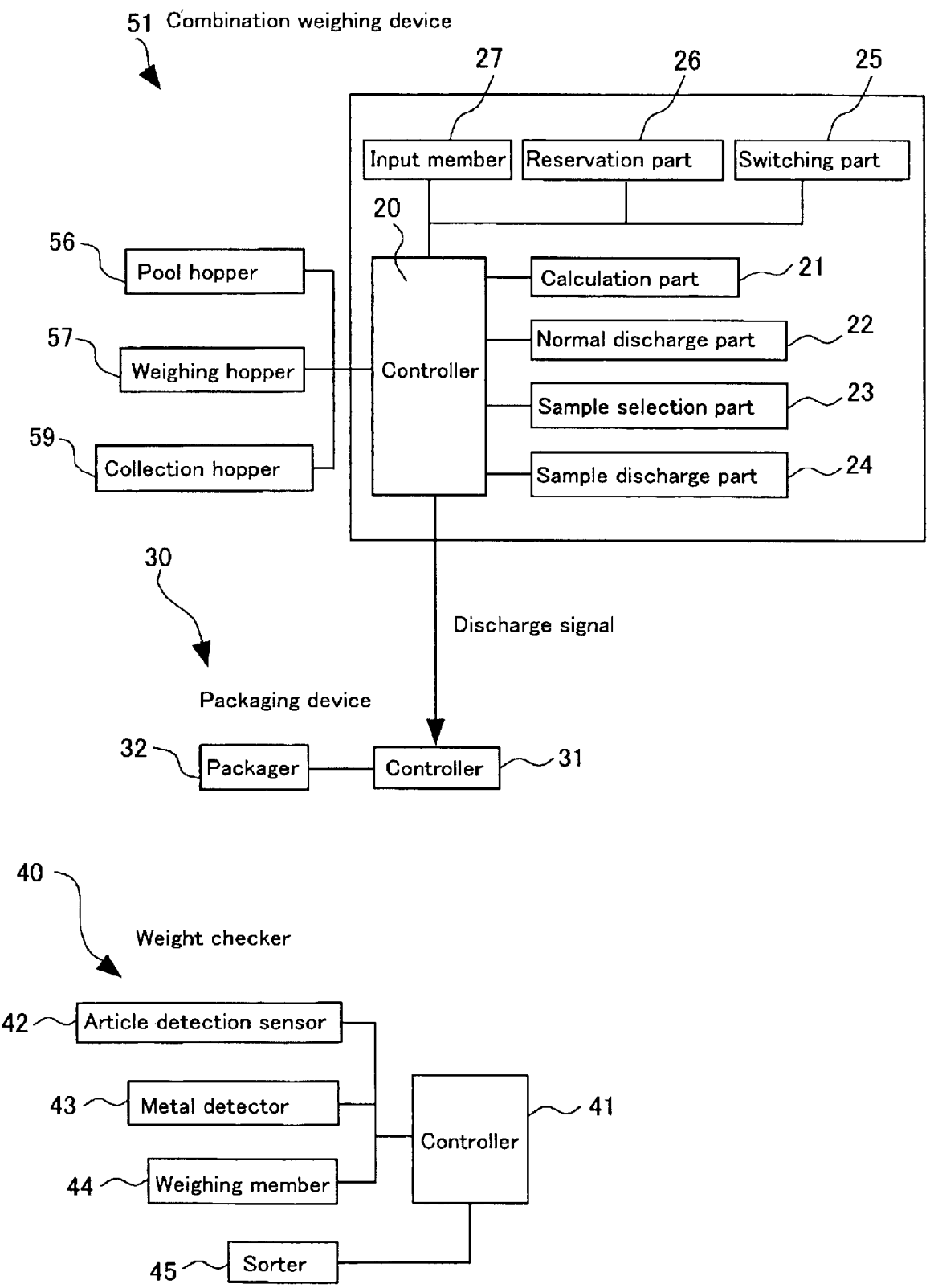
FIG. 11 shows the control blocks for the combination weighing device shown in FIG. 9.

FIG. 11 shows the control blocks for the present system. The control blocks are identical to those found in the first embodiment, except those for the hoppers that are connected to the controller 20.

In addition, the basic operation of the combination weighing device 51 is identical to that of the first embodiment.

(i) Control

Figure 12:
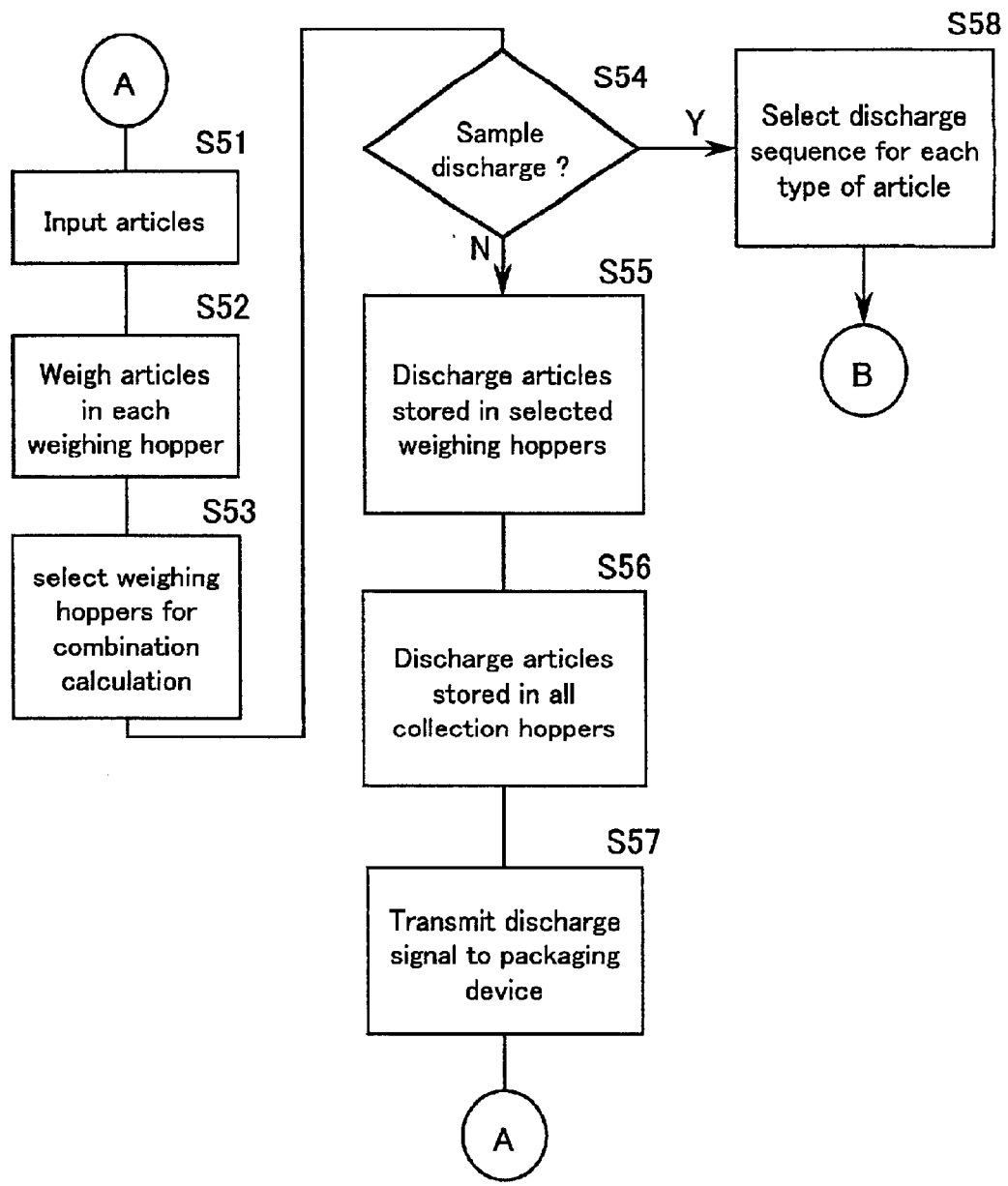
FIG. 12 is a flow chart for a combination weighing device shown in FIG. 9.
Figure 13:
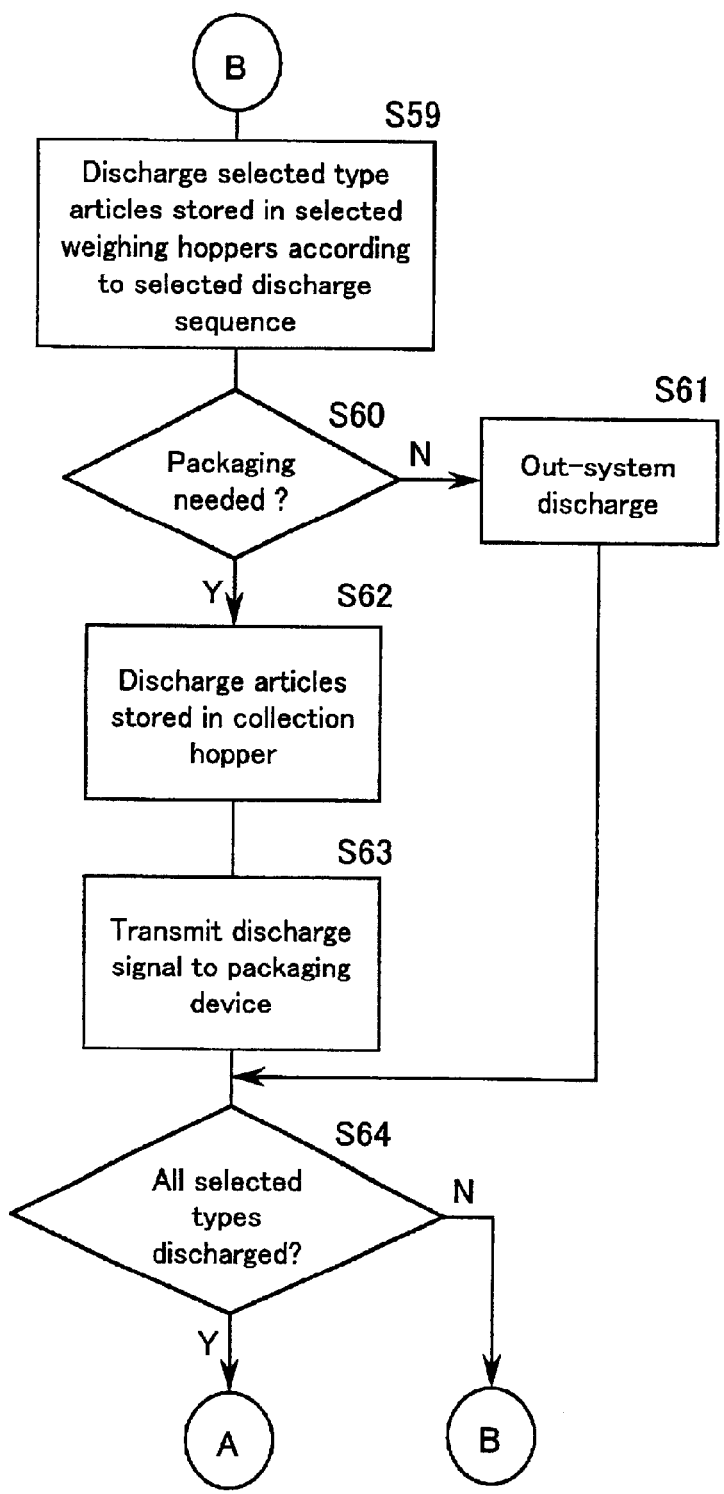
FIG. 13 is a flow chart for the combination weighing device shown in FIG. 9.

The flow charts of FIGS. 12 and 13 show the control process for the combination weighing device 51. There are two modes for discharging articles therefrom, normal and sample modes.

Note that sample discharge commands, schedules for the times in which sample discharge is to occur, and other data, can be input at any time via the input member 27. A reservation for sample discharge can include instructions to discharge samples at a fixed time, discharge samples every fixed period of time, discharge samples at every fixed amount of normal discharge, or discharge a predetermined percentage of the total volume of normal discharge as samples.

First, at Step S51, articles are supplied to empty weighing hoppers 57 from the pool hoppers 56. In other words, as described above, articles are first supplied to the distribution feeder 53 and the discharge feeders 55, and the articles stored in the discharge feeders 55 that have empty weighing feeders 57 directly below them are discharged thereto.

At Step S52, the articles supplied to the weighing hoppers 57 are weighed thereby, and the respective weights are sent to a calculation part 21. At Step S53, based upon the weights of the articles stored in the weighing hoppers 57, a combination of weighing hoppers 57 are selected by the calculation part 21 which are in a discharge weight range that has been predetermined for each type of article.

At Step S54, it is determined whether or not there is a sample discharge command from the input member 26 or the reservation part 26. If there is a command to discharge a sample, the process moves to Step S58. If there is no command to discharge a sample, the process moves to Step S55 and normal discharge is carried out.

(ii) Normal Discharge

At Step S55, the articles stored in the plurality of weighing hoppers 57 selected in Step S53 are discharged to the collection hopper 59 via the collection chutes 58. After all of the articles discharged from the plurality of weighing hoppers 57 have been moved to the collection hopper 59, the process moves to Step S56.

At Step S56, the articles stored in the collection hopper 59 are discharged to the packaging device 30, and in Step S57, a discharge signal is transmitted to the packaging device 30. After the articles have all been moved to the packaging device 30, the process moves to Step S51.

(iii) Sample Discharge

On the other hand, if a sample discharge is to take place, then the order in which each type of article is to be discharged is set at Step S58. Note that the discharge sequence selected is not limited to all types of articles being handled by the combination weighing device 51, but it is also possible to make a selection in which only certain types of articles are discharged therefrom. In addition, it is also possible to make a selection in which (a) samples are discharged according to the type of article, (b) some of the types of articles are first combined and then discharged, or (c) other combinations thereof.

For example, when three types of articles (A, B, C) are being handled by the combination weighing device 51, the device can be set such that a sample of each type of article is discharged, or can be set such that articles A and C are first combined, a sample of this combination is discharged, and then a sample of article B only is discharged.

After the selection in Step S58 is completed, the process moves to Step S59 shown in FIG. 13.

At Step S59, the articles stored in the weighing hoppers 57 are discharged to the collection hopper 59, in the sequence selected in Step S58, via the collection chutes 58.

At Step S60, it is determined whether or not the articles stored in the collection hopper 59 are to be packaged.

First, if the articles stored in the collection hopper 59 are to be discharged as is and not packaged, the process moves from Step S60 to Step S61, and the articles stored in the collection hopper 59 are sorted to the out-system discharge conveyor 68 by the collection hopper 59 and discharged away from the combination weighing device 51. The process then moves from Step S61 to Step S64.

On the other hand, if the articles stored in the collection hopper 59 are to be packaged, then the process moves from Step S60 to Step S62, and the articles stored in the collection hopper 59 are discharged to the packaging device 30. A discharge signal is then transmitted to the packaging device 30 in Step S63. After all of the articles have been moved to the packaging device 30, the process moves to Step S64.

At Step S64, it is determined whether or not all of the types of articles selected at Step S58 have been discharged. If all of the selected types of articles have been discharged, the process returns to Step S51. On the other hand, if there are still article types to be discharged, then the process returns to Step S59.

This application claims priority to Japanese Patent Application No. 2001-128698. The entire disclosure of Japanese Patent Application No. 2001-128698 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents. Thus, the scope of the invention is not limited to the disclosed embodiments.

What is claimed is:

1. A combination weighing device that weighs each type of a plurality of types of a plurality of articles, and conducts a combination weighing based upon the weights of the plurality of types of articles weighed, the combination weighing device comprising:

a calculation means that conducts a mixed combination weighing of the plurality of types of the plurality of articles weighed according to a predetermined ratio;

a normal discharge means that discharges the articles selected by the calculation means;

a sample selection means that selects a specific type of article from amongst the plurality of types of articles selected by the calculation means; and a sample discharge means that discharges the specific type of article selected by the sample selection means.

2. The combination weighing device set forth in claim 1, wherein the sample selection means selects a plurality of specific types of articles from amongst the plurality of types of articles.

3. The combination weighing device as set forth in claim 1, wherein the sample discharge means individually and serially discharges each type of article.

4. The combination weighing device as set forth in claim 1, further comprising a switching means that switches between article discharge by means of the normal discharge means and article discharge by means of the sample discharge means during normal operations.

5. The combination weighing device as set forth in claim 4, wherein the switching means discharges the articles by means of the normal discharge means after discharging the articles by means of the sample discharge means.

6. The combination weighing device as set forth in claim 1, further comprising a reservation means that reserves a selection by means of the sample selection means; and the sample selection means makes a selection based upon the reservation in the reservation means.

7. The combination weighing device as set forth in claim 6, wherein the reservation means can schedule a selection to be made at a particular time, at fixed time periods, each time a predetermined number of articles have been discharged by the normal discharge means, or as a predetermined percentage of each production run of articles.

8. The combination weighing device as set forth in claim 1, further comprising a sample sorting device that sorts the articles that are discharged by the sample discharge means.

9. A combination weighing and packaging system comprising the combination weighing device set forth in claim 1; and a packaging device that packages the articles that are discharged from the combination weighing device.

10. The combination weighing and packaging system as set forth in claim 9, further comprising a weight checker that measures the weights of the articles packaged by the packaging device.

\* \* \* \* \*